United States Patent [19]

Wahl

[11] 3,903,472

[45] Sept. 2, 1975

[54] BIDIRECTION LOCAL-REMOTE ARRANGEMENT FOR ADJUSTING TV RECEIVERS

[75] Inventor: Peter Wahl, Coburg, Germany

[73] Assignee: Loewe-Opta GmbH, Kronach, Germany

[22] Filed: Feb. 12, 1973

[21] Appl. No.: 331,995

[30] Foreign Application Priority Data

Feb. 15, 1972 Germany........................... 2207030

[52] U.S. Cl................. 325/452; 325/392; 325/465; 325/468

[51] Int. Cl.$^{2}$............................................ H04B 1/32

[58] Field of Search............ 325/392, 393, 452–454, 325/457–459, 462–466, 468, 37, 64; 323/64, 66, 67, 80; 340/171 R, 171 A, 205, 206; 343/225–228; 334/7, 8, 15, 16, 18; 307/222 R

[56] References Cited

UNITED STATES PATENTS

| | | | |
|---|---|---|---|
| 2,970,302 | 1/1961 | Gridley | 340/206 |
| 3,125,750 | 3/1964 | Bussey | 340/206 |
| 3,183,444 | 5/1965 | Roschke | 325/392 |
| 3,290,611 | 12/1966 | Horlacher et al. | 307/222 R |
| 3,518,586 | 6/1970 | Nilssen et al. | 325/465 |
| 3,602,822 | 8/1971 | Evans | 325/464 |
| 3,614,666 | 10/1971 | Ribour | 334/16 |
| 3,654,557 | 4/1972 | Sakamoto et al. | 325/465 |
| 3,665,318 | 5/1972 | Hoffman et al. | 325/459 |

*Primary Examiner*—Benedict V. Safourek
*Assistant Examiner*—Jin F. Ng

[57] ABSTRACT

A gating pulse initiated by the depression of one of two locally mounted pressure switches on a TV receiver initiates the operation of a bidirectional analog output device associated with an arbitrary function (e.g., sound volume) of the receiver. Each local gating pulse is similar in characteristics to, and is interchangeable with, a corresponding gating pulse represented by a detected carrier burst from a remote central device associated with the receiver. Each gating pulse frames a succession of clock pulses, and the resulting clock pulse train increments a digital counter in an associated one of two opposite directions. A decoded output of the counter adjusts the analog output device in the corresponding direction by an amount proportional to a change in count of the counter.

1 Claim, 3 Drawing Figures

BIDIRECTION LOCAL-REMOTE ARRANGEMENT FOR ADJUSTING TV RECEIVERS

BACKGROUND OF THE INVENTION

Various arrangements are known for electronically adjusting the analog stages that control certain specialized functions (such as channel selection) in a TV receiver. Such arrangements include command devices that are either locally mounted on or remote from the receiver.

In some locally mounted command devices presently known for channel switching, a selected one of a series of push-buttons each assigned to a given channel is made operative when depressed to generate a succession of pulses. Such pulses simultaneously increment a digital counter and drive the analog adjustment device that switches the channels. The resulting count is compared with a preset count associated with the channel assigned to the depressed button. The occurrence of a coincidence between the actual count and the desired count stops the drive of the switching device at the position corresponding to the preset channel location.

In addition, TV receivers may either separately or in addition to such local push-button selection system employ a remote control device having push-button actuated modulations capable of generating bursts of a selected one of a plurality carrier frequencies. Each burst is processed to increment an associated analog adjustment device for the function to be adjusted for a time corresponding to the burst duration. In the past, such remote control switching has been employed not only for channel selection purposes, but also for other functions such as volume control, brightness control, and the like.

The frequencies employed in such remote control arrangements are generally employed in pairs for each function to be controlled. One frequency of the pair is used to increment the analog adjuster in one direction, and the other frequency of the pair is used to increment the adjuster in the opposite direction. In general, each carrier frequency burst incident on the receiver will, after processing, actuate a clock generator for the duration of the burst, and the pulse succession at the output of the clock generator are counted in a digital counter. The resulting count may then be decoded in a digital-to-analog converter and used to increment the analog adjustment device for the relevant function in the selected one of the two opposite directions.

One disadvantage of the known TV receivers of this type is that the local and remote command circuitry do not present the same output characteristics and therefore are not fully interchangeable. As a result, in a typical case the remote control must be separately switched into the circuit whenever it is desired to use it.

Additionally, the local push-button command scheme has generally been used only for channel switching functions. The other principal functions of the receiver (e.g. volume control) usually employ manual potentiometers and other contact-type adjustment arrangements that are subject to wear. Even when the pushbutton scheme is used for automatic channel selection, the resulting incrementation of the analog switching device is generally in one direction only. As a result, a complete cycling of the channel selector may be required in order to locally select a channel adjacent to that exhibited at the start of the cycle.

SUMMARY OF THE INVENTION

The present invention provides a flexible, locally-mounted command arrangement for any of an arbitrary plurality of functions (e.g., volume control) of a TV receiver. This is accomplished in such a way that the resulting local command signals are fully compatible and interchangeable with the corresponding commands from a remote control device of the frequency burst type.

In an illustrative embodiment suitable for bidirectional incrementing of the analog adjuster for a given function, the local command scheme includes a pair of locally mounted pressure switches that may be much more inexpensive and simple than the push-button pulse generating schemes used in previous local switching arrangements, and that are preferably operable with a minimum of physical effort. Each pressure switch is associated with means responsive to the application of pressure to the switch for producing a gating pulse whose duration is proportional to the interval that pressure is continuously applied to the switch. The separate gating pulses initiated by the two switches are effective, as described below, to oppositely increment the analog adjustment device by an amount proportional to the length of the gating pulse. (Where the function is sound volume, such opposite incrementing will of course result in respectively raising and lowering the audio level).

Each gating pulse triggered by a depressed pressure switch is applied to an associated one of a pair of pulse generators. The associated pulse generator outpulses a sequence of clock pulses for an interval determined by the length of the associated input gating pulse and, consequently, by the length of time that the associated pressure switch has been continuously depressed. The output of the pulse generator is applied to an assigned one of the forward and reverse counting inputs of a reversible digital counter. The digital output of the counter is then decoded in a suitable resistance matrix and applied to the input of the bidirectional analog adjustment device for the relevant function, the latter device responds to such input by incrementing the function by an amount proportional to the length of time that the associated pressure switch has been continuously depressed.

An important feature of the invention is that the gating pulses actuated by the local command apparatus for a particular function is virtually identical in characteristics to the detected envelope of the frequency bursts corresponding to such function and generated in the remote control. Accordingly, provision is made for a parallel coupling, to the input of the pulse generating circuit associated with the selected function, of both the gating pulse from the local command station and the corresponding detected bursts from the remote control. Therefore, the pulse generating circuitry will respond interchangeably to commands initiated either by depressing the local pressure-sensitive switch or by triggering the carrier burst in the associated remote control mode.

With this arrangement a paired set of "burst" modulations in the remote control and a pair of pressure switches locally mounted on the receiver can be provided for bidirectionally adjusting any or all of the principal functions of the receiver.

BRIEF DESCRIPTION OF THE DRAWING

The invention will be further described in the following detailed description taken in conjunction with the appended drawing, in which.

DETAILED DESCRIPTION

Figure 1:
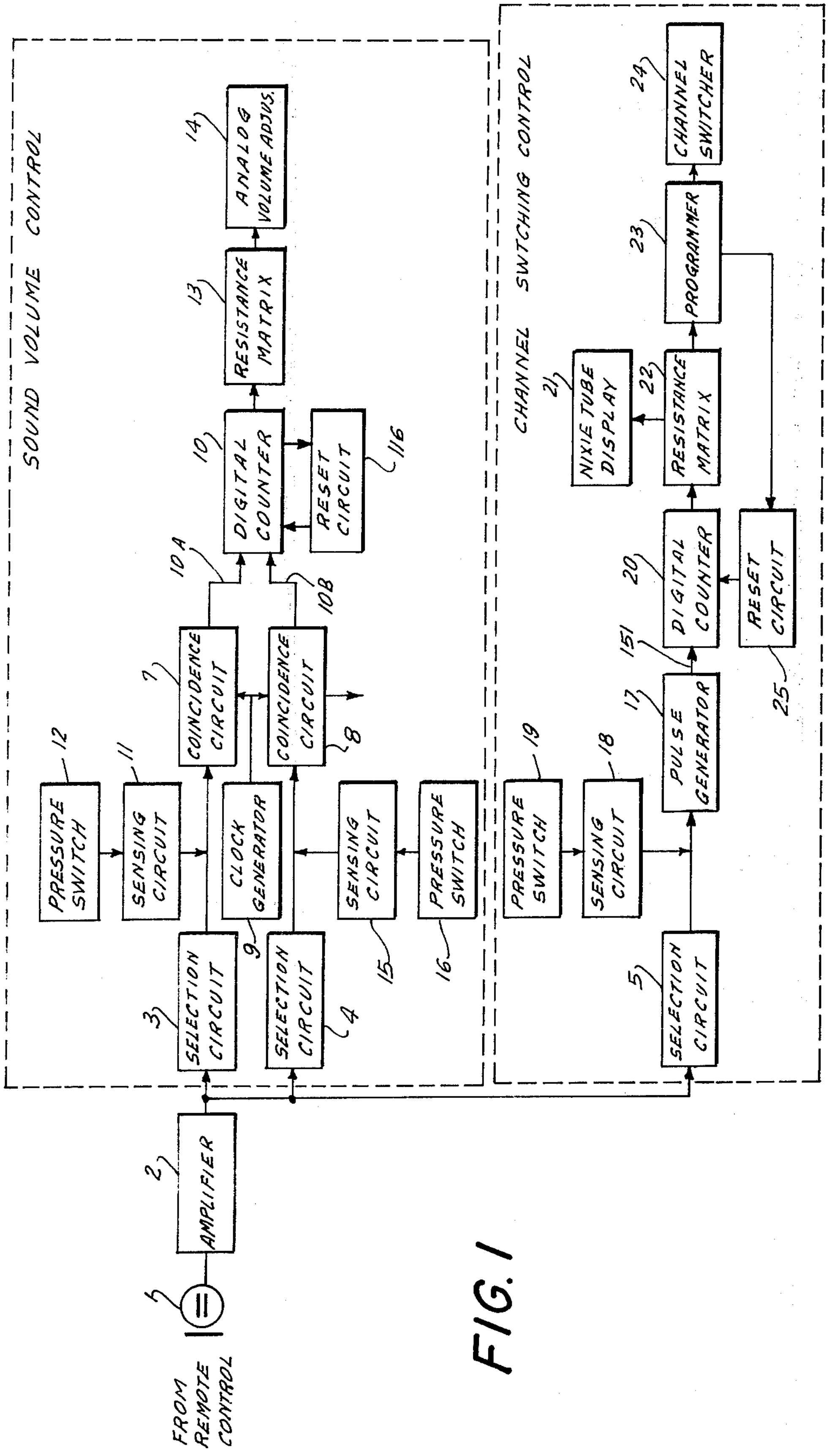
FIG. 1 is a block diagram of an arrangement in a TV receiver for separately incrementing, in response to either local or remote commands, the analog adjustment devices that control several illustrative receiver functions.

Referring now to the drawing, FIG. 1 depicts in block form an illustrative arrangement in a TV receiver for automatically adjusting a plurality of principal functions of the receiver (e.g. sound volume and channel switching), with the aid of either a conventional carrier-burst type of remote control or by the compatible, below-described locally mounted command arrangement.

In its full scope, the local command arrangement in accordance with the invention is adapted for full bidirectional capability, i.e. for effectively adjusting the relevant analog function in either one of its two opposite senses. For purposes of a concise presentation, however, only one of such functions, e.g., the sound-volume control instrumented by the components 1-4, 7-16, and 116 in FIG. 1, is completely depicted for bidirectional capability. It will be evident, however, that the other partially depicted function of channel switching (represented by components 5 and 17-25), as well as other principal non-depicted functions (such as brightness, intensity, on-off switching, etc.), can be fully controlled in a bidirectional manner with the same technique.

Referring now to the sound-volume control portion of FIG. 1, an electrostatic microphone 1 is arranged to pick up, from a conventional remote control apparatus not shown, bursts of carrier frequencies assigned to any of the several control functions in the receiver, including the illustrative frequency pair of 38 KHz and 44.5 KHz assigned to adjust the sound volume level in an upward and in a downward direction respectively. It will be recognized that each burst of a selected one of the two carrier frequencies associated with each function may be triggered by a push-button controlled modulating voltage in the remote control apparatus. The resulting carrier burst has a duration equal to the duration of the modulating voltage and therefore to the length of time that the modulating push-button is depressed.

Each frequency burst picked up in the electrostatic microphone 1 is coupled through an amplifier 2 to a pair of selection circuits 3 and 4, which are adapted respectively to detect bursts of the 38 KHz and 44.5 KHz carriers aid to demodulate the detected bursts. The resulting voltage pulse at the output of the selection circuit 3 is applied to a first input of the coincidence circuit 7. Similarly, the voltage pulse at the output of the selection circuit 4 is applied to a corresponding first input of a second coincidence circuit 8. A pulse generator 9 provides a succession of clock pulses in parallel to each of corresponding second inputs of the coincidence circuits 7 and 8, so that a clock pulse train appears at the output of the coincidence circuit 7 only during the occurrence of, and for an interval corresponding to, the duration of the voltage pulse at the output of the selection circuit 3. In like manner, a clock pulse train from the generator 9 appears at the output of the coincidence circuit 8 in synchronism with the application of the voltage pulse from the selection circuit 4 to the input of the coincidence circuit 8.

The respective output pulse trains from the coincidence circuits 7 and 8 are applied to forward and reverse counting inputs 10A and 10B, respectively, of a digital counter 10. The counter 10 illustratively has a binary coded decimal output. Each pulse in the clock pulse train applied to the positive input 10A from the coincidence circuit 7 causes an upward count increment of one unit in the counter 10, while each application of a pulse in the clock pulse train from the output of the coincidence circuit 8 causes the counter to count down by one unit. The resulting count at the output of the counter 10 is decoded in a digital-to-analog converter 13 (e.g. a resistance matrix). The resulting analog signal drives a conventional, bidirectional analog adjustment device 14 which controls the adjustment of sound volume in the receiver.

With this arrangement, it is seen that the adjustment device 14 may be driven in a positive ("louder") direction by a plurality of increments equal to the change in count in the counter 10 in response to each command frequency burst of 38 KHz, and is driven in a negative ("softer") direction by a plurality of increments equal to the change in count in the counter 10 in response to each command frequency burst of 44.5 KHz. In each case, the number of incrementing steps finally applied to the device 14 will be proportional to the burst interval of the associated carrier from the remote control device. The maximum number of incrementing steps in any one direction is, of course, determined by the maximum count capability of the counter 10.

In accordance with the invention, a compatible locally mounted command scheme that is adapted for bidirectional adjustment of the sound volume control and that can be operated interchangeably with the abovedescribed remote control, illustratively includes a pair of touch (pressure)-sensitive switches 12 and 16 operating through sensor circuits 11 and 15, respectively. The outputs of the sensor circuits 11 and 15 are individually coupled to the first inputs of the coincidence circuits 7 and 8 in parallel with the outputs of the selection circuits 3 and 4, respectively. The circuits 11, 12, and 15, 16 are chosen to produce voltage pulses whose characteristics match those of the demodulated carrier bursts at the outputs of the selection circuits 3 and 4, so that the duration of each pulse from the local command arrangement corresponds to the carrier burst length for the corresponding command from the remote control.

Figure 2:
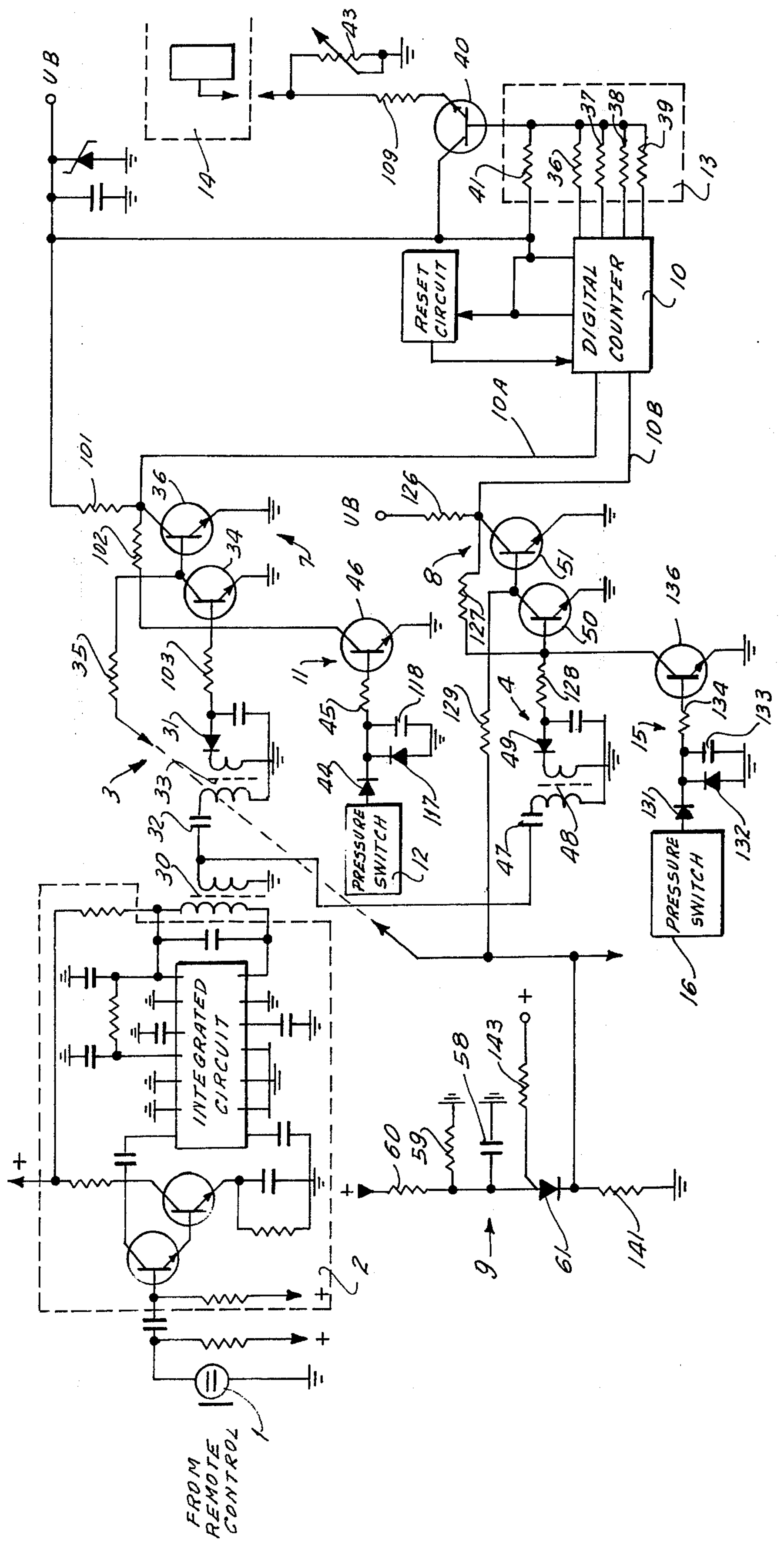
FIG. 2 is a schematic diagram of a portion of the arrangement of FIG. 1 for a particular receiver function, e.g. sound volume.

The sound volume control system illustrated in the above-identified portion of FIG. 1 considered so far, is shown in more detail in FIG. 2. The detected carrier bursts at the electrostatic microphone 1 are applied through the amplifier 2 and a transformer 30 to the 38 KHz selection circuit 3. The circuit 3 illustratively has a filter including capacitor 32 and transformer 33, and a demodulating diode 31. The demodulated burst is applied as a gating pulse of negative polarity to the base of a normally conductive transistor 34 in the coincidence circuit 7. A train of clock pulses from the pulse generator 9 is applied through a resistor 35 to the collector of the transistor 34, where such pulses are normally shorted to ground. Positive bias for the transistor 34, necessary to maintain such device normally on, is provided by a voltage VB through resistors 101 and 102 and is returned to ground through resistor 103 and diode 31.

During the interval of application to the base of transistor 34 of the voltage pulse derived from the demodulation of the 38 KHz burst, said base is driven sufficiently negative to cut off the transistor 34 and to thereby cause the application of the train of clock pulses from generator 9 to the base of output transistor 36.

Such output transistor 36 is cyclically pulsed on and off by the input pulse train, and the resulting amplified output pulse train at the collector of transistor 36 is applied to the forward count input 10A of the digital counter 10. Each pulse in the train applied to such input 10A increments the count upward by one unit, as exhibited in binary coded decimal form at the output of the counter.

The output of the counter 10 is applied to the resistance matrix 13, which illustratively includes resistors 36, 37, 38 and 39 excited by the voltage UB through a resistor 41. The analog output of the matrix 13 is applied to the base of a normally non-conductive transistor 40 which is operable to apply a selectable portion of the voltage UB to the analog sound adjusting device 14 through a voltage divider including a pair of resistors 109 and 43 (the latter being adjustable).

The counter 10 is provided with an additional reset input 111 which may be actuated by a suitable reset circuit 116. Such reset circuit may, in a conventional manner, be triggered upon either an "overflow" of the counter 10 or by an interruption of power in the apparatus, as by a momentary disabling of the supply voltage UB. (Suitable manual push-buttons may also be supplied to trigger the reset circuit 116). In any event, it will be recognized that the reset circuit may be arranged to restore the counter to a prescribed count representative of a desired "mean" level of sound, as desired.

The sensing circuit 11 actuated when the pressure-sensitive switch 12 is depressed may include a pair of diodes 44 and 117, a capacitor 118, a resistor 45 and a normally non-conductive transistor 46. The collector of the transistor 46 is connected to the base of the transistor 34 in the coincidence circuit 7, so that the actuation of the transistor 46 upon the depression of the switch 12 operates to cut off the normally conductive transistor 34. This permits the clock pulses from the generator 9 to be applied to the base of the transistor 36 via the resistor 35 and the collector of the transistor 34 for the duration of the excitation of the transistor 46 (i.e., for the duration of pressure applied to the switch 12). As a consequence, a correspondingly framed train of pulses is developed by the transistor 36 and applied as before to the forward input 10A of the counter 10, with corresponding results.

In like manner, each negative increment carrier burst of 44.5 KHz, after being processed in the electrostatic microphone 1 and amplified in the stage 2, is applied via the transformer 30 to the 44.5 KHz selection circuit 4. The circuit 4 includes a capacitor 47, a transformer 48, and a demodulating diode 49. The demodulated output pulse (of negative polarity) from the selection circuit 4 is applied to the base of an input transistor 50 of the coincidence circuit 8. In a manner identical to that described in connection with the positive incrementing circuitry associated with the coincidence circuit 7, the transistor 50 is normally maintained in a conductive condition via a positive bias by the voltage UB acting through a pair of resistors 126 and 127 and returned to ground through resistor 128 and the diode 49. The application of the negative voltage pulse to the transistor 50 overcomes this positive bias to cut off the transistor 50, and permits the clock pulses from the generator 9 to be coupled to the base of an output transistor 51 of the coincidence circuit 8 via resistor 129 and the collector of transistor 50.

The corresponding output pulse train at the collector of the transistor 51 is applied to the reverse count input 10B of the counter 10. Such latter pulse train will be thus counted so long as the excitation of the base of transistor 50 continues. The resulting decreased count in the counter 10 is decoded in the matrix 13 to drive the analog adjusting device 14 in a direction opposite to the direction of movement when the forward input lead 10A of the counter was excited.

By analogy to the description of the local pressure switch 12 and the associated sensing circuitry 11, a local command arrangement including a pressure-sensitive switch, 16 and a sensing device 15 is provided to be employed interchangeably with the 44.5 KHz carrier burst. The circuit 15 includes a pair of diodes 131 and 132, a capacitor 133, a resistor 134 and a normally non-conductive transistor 136. Upon the application of pressure to the switch 16 for a given interval, the transistor 136 is excited to effectively overcome the positive bias on the input transistor 50 of the coincidence circuit 8. This permits the application of the pulse train from the clock generator 9 to the input of the transistor 51 in the manner described above; and such application in turn results in a corresponding pulse train excitation of the counter input 10B from the collector of the transistor 57.

The clock generator 9 may be embodied as a conventional RC generator. The transconductive path of a thyristor 61 is excited from a suitable DC source via a pair of resistors 60 and 141. The anode load for the thyristor includes a resistor 59 and a capacitor 58 in parallel, which are DC coupled to the control electrode of the thyristor 61 through a resistor 143. The output of the clock generator 9 is taken from the cathode of the thyristor 61.

Referring back to FIG. 1, the components 5 and 17-25 illustrate the positive incrementing portion of a local-remote command arrangement similar in principle to that described above but adapted for automatically adjusting the channel selection function of the receiver. Such automatic selection may be made via carrier bursts of one of a second assigned pair of carrier frequencies from the remote control unit, or alternatively may be initiated through a pressure switch 19 and sensor circuit 18 similar to the elements 12, 11 and 16, 15 described above. For example, when it is desired to increment the channel selection function in an "upward" direction, a suitable burst initiated at the remote control device at the assigned carrier frequency is detected and demodulated by the selection circuit 5 and is applied as a gating pulse to the input of a pulse generator 17. The output of the generator 17, like that of the clock generator 9 described above, is a succession of clock pulses which are applied to a positive count input 151 of a digital counter 20. The resulting change in count in the counter 20 is decoded by a decoder 22. The analog output of the decoder 22, which initiates a display on Nixie tube 21 as described below, is processed through a programmer 23 which excites a channel switching device 24 in correspondence with the analog level at the output of the decoder 22.

The counter 20 may be provided with a reset circuit 25 that is responsive either to an overflow of the counter 20 or to an interruption of power, for restoring the count in the counter 20 to a predetermined intermediate value representative of a desired "mean" channel.

The gating of the pulse generator 17 may also be locally initiated by the switch 19. The depression of such switch causes the generation, at the output of the sensor circuit 18, of a gating pulse whose duration corresponds to the duration of pressure applied to the switch 19 and whose characteristics are similar to the demodulated voltage pulse at the output of the selection circuit 5.

While not specifically illustrated in the drawing, it will be understood that a negative incrementing of the channel switching device 24 can also be interchangeably controlled by corresponding local and remote apparatus.

Figure 3:
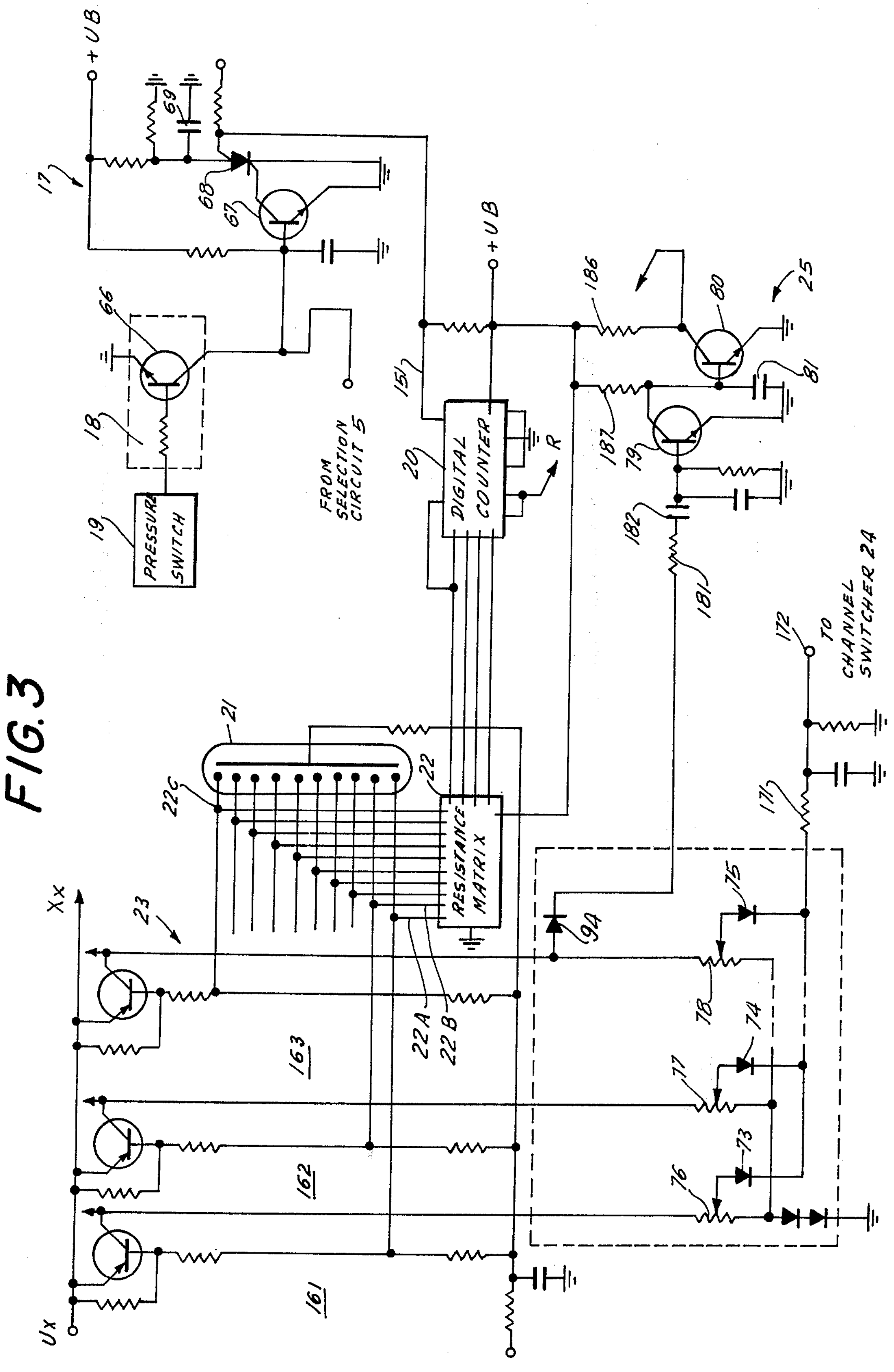
FIG. 3 is a schematic diagram of a portion of the arrangement of FIG. 1 for another receiver function, e.g. channel switching.

The channel switching scheme instrumented by the components 5 and 17-25 in FIG. 1 is shown in more detail in FIG. 3. Again, only the positive incrementing function is shown for purposes of illustration. An appropriate remote control carrier burst will, after detection and demodulation as described above, be applied from the output of the selection circuit 5 to the base of a normally non-conductive transistor 67 in the pulse generator 17. The resulting conduction of the transistor 67 triggers a thyristor 68 into conduction. The latter in turn establishes a low impedance discharge path for a capacitor 69, and the resulting current flow through the thyristor 68 establishes an output pulse which is coupled from the anode of the thyristor 68 to the forward count input 151 of the counter 20.

The output characteristic of the thyristor 68 will be a train of pulses over an interval proportional to the length of time that the transistor 67 is continually excited by the voltage pulse applied to the base of the transistor 67. During such excitation the thyristor 68 will cease conduction each time the capacitor 69 fully discharges but will then immediately resume conduction as soon as the capacitor 69 has been recharged through the changing path immediately established after such turn-off of the thyristor 68.

The binary coded decimal output from the counter 20 is applied to the decoder 22. The matrix 22 is provided with a plurality of discrete output terminals (e.g., 22A, 22B, etc.) which are individually excited upon the detection by the decoder 22 of a particular output count from the counter 20. In a conventional manner, each output terminal of the decoder 22 is associated with a separate "cell" of the Nixie tube 21, which visually exhibits the channel that corresponds to the associated analog level at the decoder output. Each such output terminal of the decoder is also associated with a separate one of a plurality of switching paths 161, 162, 163 in the programmer 23. The total number of switching paths correspond in practice to the number of discrete channels to be switched in the receiver; however, for illustration only three of such paths are shown.

Each of the switching paths 161, 162 and 163 is regulated by an associated one of three normally nonconductive transistors 70, 71 and 72. The individual switching paths are enabled whenever the associated transistor is switched into conduction by the presence of a potential on the appropriate terminal of the decoder 22, each such potential being coupled to the base of the associated transistor.

The excitation of the transistor 70 by a potential on the output terminal 22A, for example, establishes a conductive path for the application of a selectable portion of a common voltage $U_x$ through the collectoremitter path of the transistor 70, a variable resistor 76, a diode 73, and a resistor 171 to define the required analog switching voltage at output terminal 172.

Similarly, the excitation of the transistor 71 by the output terminal 22B causes a different portion of the voltage $U_x$ to be applied through the collector-emitter path of transistor 71, variable resistor 77, diode 74, and resistor 171 to terminal 172; and the excitation of the transistor 72 by the output terminal 22C causes still a third different portion of the voltage $U_x$ to be applied through the collector-emitter path of transistor 72, variable resistor 78, diode 75, and resistor 171 to the terminal 172.

It will be understood that the variable resistors 76, 77, and 78 may be adjusted to respectively supply channel switching voltages of the correct magnitudes to the output terminal 172.

When the rightmost switching path 163 is enabled, a portion of the voltage $U_x$ is also applied via the collector-emitter path of the transistor 72, a diode 94, a resistor 181, and a capacitor 182 to the input of reset circuit 25.

The reset circuit includes a normally nonconductive input transistor 79 and a normally conductive output transistor 80. A supply voltage UB is coupled to the collectors of the transistors 80 and 79 through resistors 186 and 187, respectively.

The potential developed across a capacitor 81 in the base circuit of the transistor 80 serves to normally keep the transistor 80 on and to keep the potential at the collector terminal R at a relatively low value. (The terminal R is coupled to the reset input of the counter 20.)

When the path 163 in the programer 23 is switched, however, the transistor 79 is turned on to effectively short the capacitor 81 and switch the transistor 80 off. The resultant rise in potential at the reset terminal R is effective to initiate reset of the counter 20 so that the next clock pulse applied thereto from the pulse generator 17 is effective to re-establish the preset "mean" channel as indicated above.

Such reset operation can also be triggered by an interruption of power, e.g. by a temporary failure of the voltage UB. In the latter case, such failure will disable the transistor 80. Since the restoration of the voltage UB will not immediately return such transistor to conduction because of the finite charging time of the capacitor 81, the potential at the terminal R will remain high between the instant of restoration of the power and the time that transistor 80 is switched back on. Such high potential will effect the reset of the counter 20, as before.

In the foregoing, the invention has been described in connection with preferred arrangements thereof. Various modifications will now occur to those skilled in the art. For example, it will be evident that the above-described bidirectional local pressure switch control can be advantageously used interchangeably with a remote control for any other receiver function such as on-off switching. It is accordingly desired that the scope of the appended claims not be limited to the specific disclosure herein contained.

What is claimed is:

1. In a TV receiver having associated therewith remote control means including means for generating variable duration bursts of a selected one of first and second predetermined characteristic frequencies individually representative of positive and negative adjustments of a prescribed receiver function, the receiver including first and second selection means for individually detecting bursts of the first and second frequencies and for individually producing first and second gating pulses proportional to the burst interval of the detected frequency, an improved arrangement for effecting the interchangeable driving of a bidirectional analog adjustment device associated with an arbitrary electrical function of the receiver by either said remote control facilities or by means locally mounted on the receiver, which comprises:

a reversible digital counter having forward and reverse inputs;

means including a digital-to-analog converter for coupling the output of the counter to the inputs of thc analog adjustment device;

first local command means comprising, in combination, a first manually accessiblle pressure-sensitive switch, and means responsive to the aplication of pressure to the first switch for producing a third gating pulse proportional to the interval that the pressure is applied to the first switch;

second local command means comprising, in combination, a second manually accessible pressure-sensitive switch and means responsive to the application of pressure to the second switch for producing a fourth gating pulse proportional to the interval that the pressure is applied to the second switch;

a clock pulse source;

first coincidence means having a first input coupled to the output of the clock pulse source and a second input coupled to the output of the first local command means and the output of the first selection means;

second coincidence means having a first input coupled to the output of the clock pulse source and a second input coupled to the output of the second local command means and the second selection means; and means for individually coupling the outputs of the first and second coincidence means to the forward and reverse inputs, respectively, of the counter.

* * * * *